United States Patent
Ohno

(10) Patent No.: US 8,581,998 B2
(45) Date of Patent: Nov. 12, 2013

(54) IMAGE SENSING APPARATUS AND METHOD OF CONTROLLING THE IMAGE SENSING APPARATUS

(75) Inventor: Takenori Ohno, Yokohama (JP)

(73) Assignee: Canon Kabushiki Kaisha, Tokyo (JP)

(\*) Notice: Subject to any disclaimer, the term of this patent is extended or adjusted under 35 U.S.C. 154(b) by 126 days.

(21) Appl. No.: 13/308,907

(22) Filed: Dec. 1, 2011

(65) Prior Publication Data

US 2012/0154651 A1 Jun. 21, 2012

(30) Foreign Application Priority Data

Dec. 17, 2010 (JP) ................................ 2010-282397
Nov. 16, 2011 (JP) ................................ 2011-251024

(51) Int. Cl.
*H04N 5/228* (2006.01)
*H04N 3/14* (2006.01)
*H04N 5/335* (2011.01)
*H04N 5/222* (2006.01)
*H04N 5/225* (2006.01)

(52) U.S. Cl.
USPC ............... 348/222.1; 348/294; 348/333.01; 348/333.05; 348/335; 348/340

(58) Field of Classification Search
None
See application file for complete search history.

(56) References Cited

U.S. PATENT DOCUMENTS

| | | | |
|---|---|---|---|
| 6,961,089 B2 | 11/2005 | Kubo | |
| 7,652,679 B2 | 1/2010 | Aratani et al. | |
| 7,932,941 B2 * | 4/2011 | Hayasaka et al. | 348/267 |
| 7,936,392 B2 | 5/2011 | Ng et al. | |
| 8,106,994 B2 * | 1/2012 | Ichimura | 348/340 |
| 8,325,241 B2 * | 12/2012 | Yoshioka | 348/207.99 |
| 8,368,744 B2 * | 2/2013 | Yamada | 348/54 |
| 2002/0028014 A1 * | 3/2002 | Ono | 382/154 |
| 2002/0126210 A1 * | 9/2002 | Shinohara et al. | 348/219 |
| 2003/0071905 A1 * | 4/2003 | Yamasaki | 348/239 |
| 2007/0230944 A1 * | 10/2007 | Georgiev | 396/322 |
| 2009/0128658 A1 * | 5/2009 | Hayasaka et al. | 348/222.1 |

(Continued)

FOREIGN PATENT DOCUMENTS

| | | |
|---|---|---|
| JP | 05-134294 A | 5/1993 |
| JP | 2001-186401 A | 7/2001 |
| JP | 2006/039486 A | 4/2006 |
| JP | 2009-165115 A | 7/2009 |

OTHER PUBLICATIONS

Ren. Ng, et al "Light Field Photography with a Hand-Held Plenoptic Camera", Stanford Tech Report CTSR Feb. 2005.

*Primary Examiner* — Michael Osinski
(74) *Attorney, Agent, or Firm* — Fitzpatrick, Cella, Harper & Scinto

(57) ABSTRACT

A sensed image generated from an image signal output from an image sensor for receiving light that becomes incident sequentially through an imaging lens and a microlens array that is a two-dimensional array including a plurality of microlenses is acquired. A list is created in which, for each pixel position on the image sensor, the correspondence between the coordinates of the light incident at the pixel position on the imaging lens and the coordinates of the pixel position is registered. Images obtained by rearranging pixels at the coordinate positions on the image sensor corresponding to the coordinates in accordance with the arrangement order of the coordinates on the imaging lens are generated as a parallax image group.

6 Claims, 21 Drawing Sheets

(56) References Cited

U.S. PATENT DOCUMENTS

2009/0185801 A1* 7/2009 Georgiev et al. .............. 396/332
2010/0039501 A1* 2/2010 Nakamura et al. ............. 348/46
2010/0283884 A1* 11/2010 Hayasaka et al. ............. 348/340
2011/0019067 A1* 1/2011 Matsumoto et al. .......... 348/346
2011/0242289 A1* 10/2011 Fukushima et al. ........... 348/51
2012/0019625 A1* 1/2012 Mishima et al. ............... 348/49
2012/0081513 A1* 4/2012 Yamada ......................... 348/43
2012/0154551 A1* 6/2012 Inoue ............................. 348/49

* cited by examiner

FIG. 9

| COORDINATES (x,y) OF PIXEL | CORRESPONDING COORDINATES (u,v) OF IMAGING LENS | CORRESPONDING AREA OF IMAGING LENS |
|---|---|---|
| (1, 1) | (0.333, −1) | ML(3, 1) |
| (2, 1) | (−0.333, −1) | ML(2, 1) |
| (3, 1) | (−1, −1) | ML(1, 1) |
| (4, 1) | (0.334, −1) | ML(3, 1) |
| (5, 1) | (−0.332, −1) | ML(2, 1) |
| (6, 1) | (−0.999, −1) | ML(1, 1) |
| (7, 1) | (0.335, −1) | ML(3, 1) |
| (8, 1) | (−0.331, −1) | ML(2, 1) |
| (9, 1) | (−0.998, −1) | ML(1, 1) |
| (10, 1) | (0.335, −1) | ML(3, 1) |
| (11, 1) | (−0.331, −1) | ML(2, 1) |
| (12, 1) | (−0.997, −1) | ML(1, 1) |
| ⋮ | ⋮ | ⋮ |

FIG. 15

| ML(1,1) | ML(2,1) | ML(3,1) | ML(4,1) | ML(5,1) |
| ML(1,2) | ML(2,2) | ML(3,2) | ML(4,2) | ML(5,2) |
| ML(1,3) | ML(2,3) | ML(3,3) | ML(4,3) | ML(5,3) |
| ML(1,4) | ML(2,4) | ML(3,4) | ML(4,4) | ML(5,4) |
| ML(1,5) | ML(2,5) | ML(3,5) | ML(4,5) | ML(5,5) |

DISPLAY IMAGE DATA

FIG. 16

|  |  | ML(3,1) |  |  |
|  | ML(2,2) | ML(3,2) | ML(4,2) |  |
| ML(1,3) | ML(2,3) | ML(3,3) | ML(4,3) | ML(5,3) |
|  | ML(2,4) | ML(3,4) | ML(4,4) |  |
|  |  | ML(3,5) |  |  |

DISPLAY IMAGE DATA

| ML(2,2) | ML(3,1) | ML(4,2) |
|---|---|---|
| ML(1,3) | ML(3,3) | ML(5,3) |
| ML(2,4) | ML(3,5) | ML(4,4) |

— DISPLAY IMAGE DATA

116 — DISPLAY UNIT

GUI

104 IMAGE SENSOR
LIGHT-RECEIVING AREA
NON-LIGHT-RECEIVING AREA

| ML(1,1) | ML(2,1) | ML(3,1) | ML(4,1) | ML(5,1) |
|---------|---------|---------|---------|---------|
| ML(1,2) | ML(2,2) | ML(3,2) | ML(4,2) | ML(5,2) |
| ML(1,3) | ML(2,3) | ML(3,3) | ML(4,3) | ML(5,3) |
| ML(1,4) | ML(2,4) | ML(3,4) | ML(4,4) | ML(5,4) |
| ML(1,5) | ML(2,5) | ML(3,5) | ML(4,5) | ML(5,5) |

PARALLAX IMAGE DATA

FIG. 23

| ML(1,1) | ML(2,1) | ML(3,1) | — PARALLAX IMAGE DATA |
|---------|---------|---------|---|
| ML(1,2) | ML(2,2) | ML(3,2) | |
| ML(1,3) | ML(2,3) | ML(3,3) | |

FIG. 24

| ML(1,1) | ML(2,1) | ML(3,1) | ML(4,1) | ML(5,1) | ML(6,1) | ML(7,1) |
|---------|---------|---------|---------|---------|---------|---------|
| ML(1,2) | ML(2,2) | ML(3,2) | ML(4,2) | ML(5,2) | ML(6,2) | ML(7,2) |
| ML(1,3) | ML(2,3) | ML(3,3) | ML(4,3) | ML(5,3) | ML(6,3) | ML(7,3) |
| ML(1,4) | ML(2,4) | ML(3,4) | ML(4,4) | ML(5,4) | ML(6,4) | ML(7,4) |
| ML(1,5) | ML(2,5) | ML(3,5) | ML(4,5) | ML(5,5) | ML(6,5) | ML(7,5) |
| ML(1,6) | ML(2,6) | ML(3,6) | ML(4,6) | ML(5,6) | ML(6,6) | ML(7,6) |
| ML(1,7) | ML(2,7) | ML(3,7) | ML(4,7) | ML(5,7) | ML(6,7) | ML(7,7) |

IMAGE SENSING APPARATUS AND METHOD OF CONTROLLING THE IMAGE SENSING APPARATUS

BACKGROUND OF THE INVENTION

1. Field of the Invention

The present invention relates to an image sensing technique.

2. Description of the Related Art

In a digital camera, conventionally, an object image is formed on an image sensing element through an imaging lens, and image information obtained by the image sensing element is displayed on an LCD (Liquid Crystal Display). The digital camera includes an electronic viewfinder (EVF) to observe the image information formed on the LCD (Japanese Patent Laid-Open No. 5-134294).

Also known is a digital camera using live view display in which a shutter arranged on the whole surface of an image sensing element is opened to project an object image on the image sensing element, thereby displaying the video in an image display LCD (Japanese Patent Laid-Open No. 2001-186401).

International Patent Publication No. 06/039486 and Ren. Ng, et al "Light Field Photography with a Hand-Held Plenoptic Camera", Stanford Tech Report CTSR 2005-02 propose an image sensing apparatus using a method called "Light Field Photography". This image sensing apparatus includes an imaging lens, a microlens array, an image sensing element, and an image processing unit. Sensed image data obtained from the image sensing element includes not only the light intensity distribution on the light-receiving surface but also the information of the light traveling direction. The image processing unit can reconstruct an image observed from a plurality of viewpoints or directions.

However, when the image sensing apparatus including the microlens array arranged in front of the image sensing element senses an object as shown in FIG. 20A using an aperture stop having a circular opening portion, the live view display image includes a non-light-receiving area, as shown in FIG. 20B. For this reason, it is difficult for the user to determine the focus position.

SUMMARY OF THE INVENTION

The present invention has been made in consideration of the above-described problem, and provides a technique for converting a live view display image into an image for which the user can easily determine the focus position.

According to the first aspect of the present invention, an image sensing apparatus comprises: a unit that acquires a sensed image generated from an image signal output from an image sensor for receiving light that becomes incident sequentially through an imaging lens and a microlens array that is a two-dimensional array including a plurality of microlenses; a creation unit that creates a list in which, for each pixel position on the image sensor, a correspondence between coordinates of the light incident at the pixel position on the imaging lens and coordinates of the pixel position is registered; a generation unit that generates, as a parallax image group, images obtained by rearranging pixels at pixel positions on the image sensor corresponding to the coordinates in accordance with an arrangement order of the coordinates on the imaging lens registered in the list; and an output unit that outputs the images generated by the generation unit.

According to the second aspect of the present invention, a method of controlling an image sensing apparatus including an image sensor for receiving light that becomes incident sequentially through an imaging lens and a microlens array that is a two-dimensional array including a plurality of microlenses, comprises: a step of acquiring a sensed image generated from an image signal output from the image sensor; a creation step of creating a list in which, for each pixel position on the image sensor, a correspondence between coordinates of the light incident at the pixel position on the imaging lens and coordinates of the pixel position is registered; a generation step of generating, as a parallax image group, images obtained by rearranging pixels at pixel positions on the image sensor corresponding to the coordinates in accordance with an arrangement order of the coordinates on the imaging lens registered in the list; and an output step of outputting the images generated in the generation step.

Further features of the present invention will become apparent from the following description of exemplary embodiments with reference to the attached drawings.

BRIEF DESCRIPTION OF THE DRAWINGS

FIG. 9 is a table showing an example of the arrangement of a light field;

FIG. 15 is a view showing an example in which all parallax images are arranged in accordance with extraction start coordinates when m=5 and n=5;

FIG. 16 is a view showing an example in which only parallax images each having an average pixel value equal to or larger than a threshold are arranged and displayed on the display screen of the display unit 116;

FIG. 23 is a view showing parallax images when the parallax number is 3×3;

FIG. 24 is a view showing parallax images when the parallax number is 7×7;

DESCRIPTION OF THE EMBODIMENTS

The embodiments of the present invention will now be described with reference to the accompanying drawings. Note that the embodiments to be described below are merely examples of detailed practice of the present invention and represent detailed examples of the arrangement in the appended claims.

[First Embodiment]

In this embodiment, an example will be described in which an image sensing apparatus holding a microlens array converts a live view display image into an image that facilitates focusing on the display unit that displays the live view display image.

<Example of Arrangement of Image Sensing Apparatus>

Figure 1:
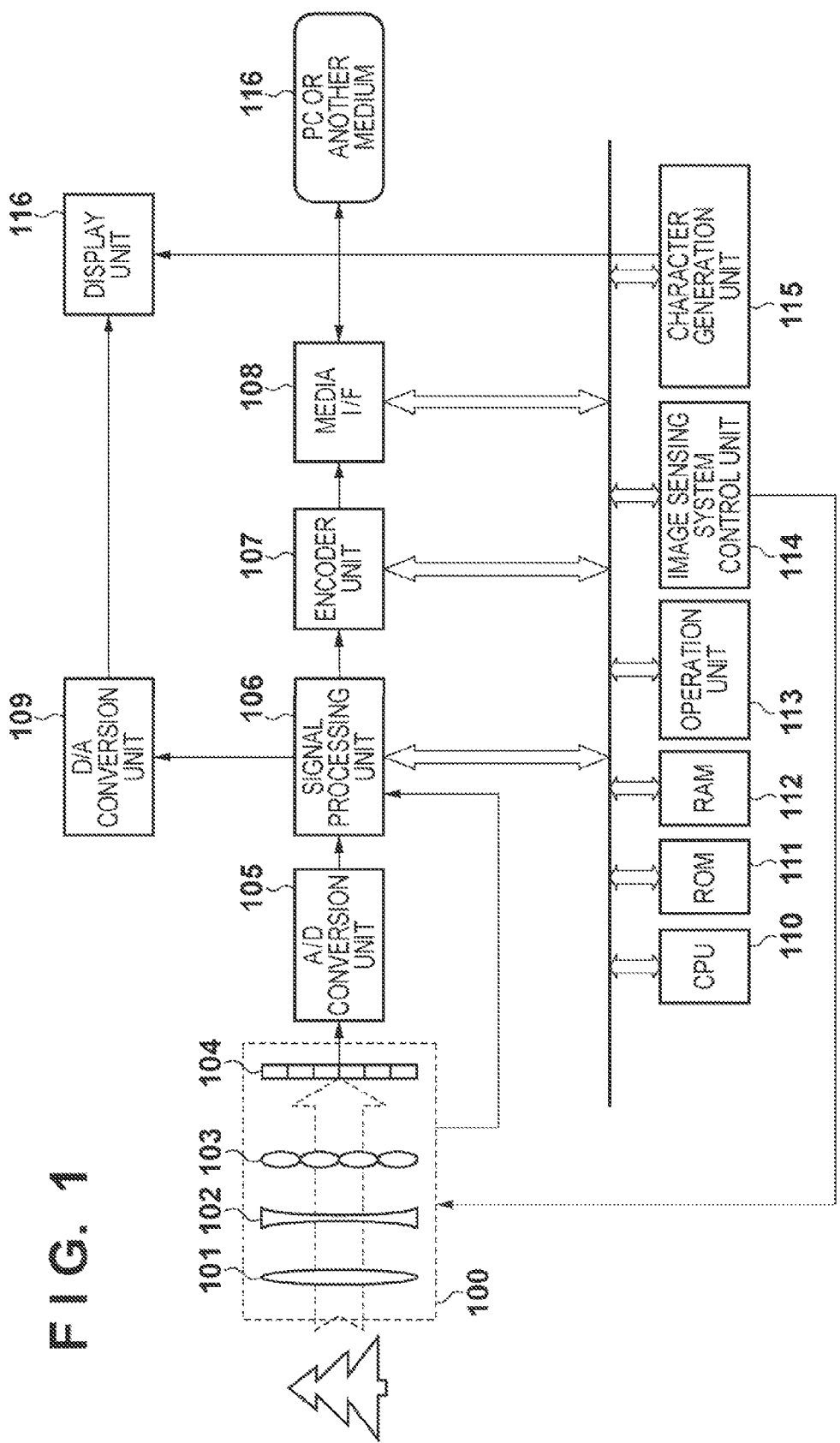
FIG. 1 is a block diagram showing an example of the arrangement of an image sensing apparatus.

An example of the arrangement of an image sensing apparatus according to this embodiment will be described with reference to the block diagram of FIG. 1. Note that FIG. 1 shows an example of major components for each processing to be described below, and the arrangement of the image sensing apparatus applicable to this embodiment is not limited to that shown in FIG. 1. That is, a component may be added to the arrangement shown in FIG. 1. Some of the units shown in FIG. 1 may be integrated. One constituent element may be decomposed into two or more constituent elements. Processing to be described later as processing to be executed by a given constituent element may be allotted to another constituent element.

An imaging lens 101 is the main lens configured to sense an object and includes, for example, a general zoom lens, focus lens, and blur correction lens used in a video camera, a still camera, or the like.

Figure 3:
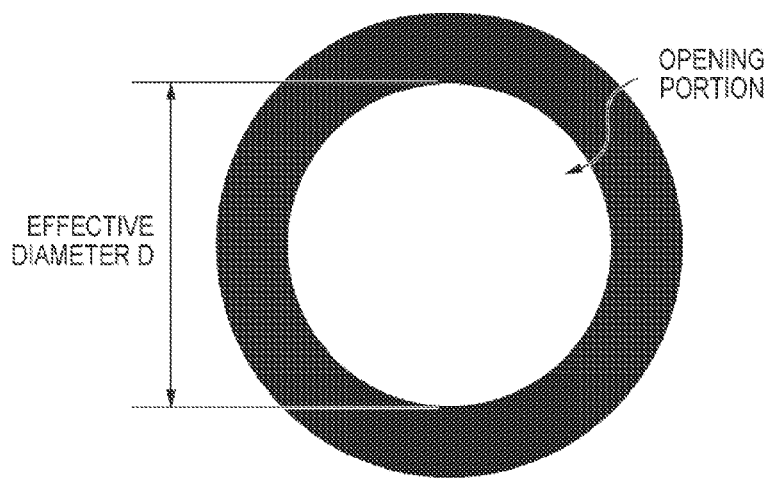
FIG. 3 is a view showing an aperture stop 102.

An aperture stop 102 is an optical aperture stop for the imaging lens 101. The aperture stop 102 has, for example, one circular opening portion at the center, as shown in FIG. 3. The black frame portion indicates a non-opening portion formed by stopping down the aperture stop to some degree. The diameter of the opening portion (the effective diameter of the imaging lens 101) will be referred to as D. The aperture stop 102 is arranged apart from a microlens array 103 by a distance L.

The microlens array 103 is, for example, a two-dimensional array formed by two-dimensionally arraying a plurality of microlenses in a matrix, and is arranged on the imaging plane of the imaging lens 101. Each microlens has, for example, a circular or hexagonal planar shape and is formed from a solid lens, a liquid crystal lens, a liquid lens, a diffraction lens, or the like.

The imaging lens 101, the aperture stop 102, the microlens array 103, and an image sensor (image sensing element) 104 will be referred to as an image sensing unit 100 together.

Figure 4:
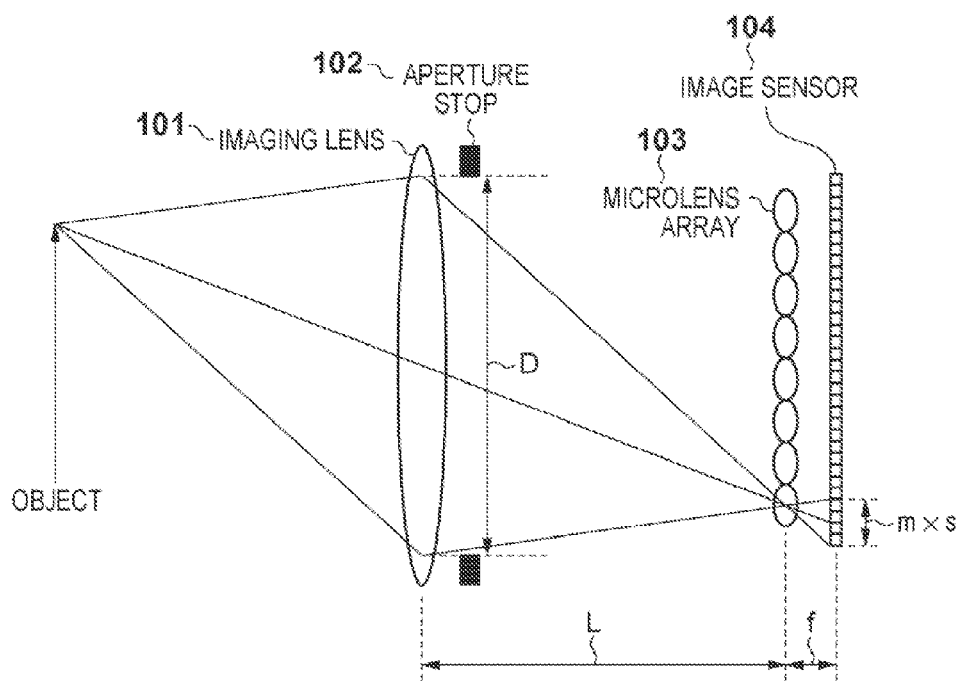
FIG. 4 is a view showing the positional relationship.

FIG. 4 shows the positional relationship between the imaging lens 101, the aperture stop 102, the microlens array 103, and the image sensor 104. In this case, m is the number of pixels assigned to one direction (vertical direction in FIG. 4) of each microlens of the microlens array 103, s is the size (pixel size) in one side direction (vertical direction in FIG. 4) of an image sensing element (pixel) included in the image sensor 104, and L is the distance between the aperture stop 102 and the microlens array 103, as described above. Note that the distance between the imaging lens 101 and the aperture stop 102 is so short as to be negligible. For this reason, L represents the distance between the imaging lens 101 and the microlens array 103 in FIG. 4. D represents the effective diameter of the imaging lens 101, as described above, and f represents the distance between the microlens array 103 and the image sensor 104.

In other words, the number m of pixels is the number of pixels in one direction (vertical direction in FIG. 4) of an area (light-receiving area) where the image sensor 104 receives light that has become incident through one microlens. The assigned number m of pixels can be calculated by $$(m \times s) : f = D : L$$

$$m = D \times f / (L \times s) \quad (1)$$

However, only a positive integer can be adopted as m, as a matter of course. Hence, if a real number is obtained as m by calculating equations (1), the first decimal place is rounded up to an integer.

Referring back to FIG. 1, the image sensor 104 receives light that has become incident through the microlens array 103 (each microlens) and acquires the light amount of the object. The image sensor 104 is arranged on the focal plane of the microlens array 103 (each microlens). The image sensor 104 includes a plurality of image sensing elements two-dimensionally arrayed in a matrix. A CCD (Charge Coupled Device) or a CMOS (Complementary Metal-Oxide Semiconductor) can be employed as the image sensing element. As a matter of course, if the correspondence between a position on the light-receiving surface of the image sensor 104 and a position on an image output from the image sensor 104 can be ensured, the arrangement of the image sensor 104 is not particularly limited.

In this embodiment, M×N pixels (image sensing elements) are two-dimensionally arranged in a matrix on the light-receiving surface of the image sensor 104. Light that has passed through one microlens is received in an area (light-receiving area) formed from a plurality of pixels. The number of pixels on the light-receiving surface is, for example, M×N=5180×3450=17871000.

Let m be the number of pixels (the assigned number of pixels for the horizontal direction) calculated using equations (1) for the horizontal direction of the light-receiving area, and n be the number of pixels (the assigned number of pixels for the vertical direction) calculated using equations (1) for the vertical direction. In this case, the numbers m and n of pixels are related to the resolving power at an arbitrary viewpoint of a parallax image to be finally generated. For this reason, the resolving power at an arbitrary viewpoint of a parallax image rises as the values m and n increase. On the other hand, (M/m) and (N/n) are related to the number of pixels (resolution) of a parallax image. For this reason, the number of pixels of a parallax image increases as the values (M/m) and (N/n) increase. Hence, the number of pixels and the resolving power at an arbitrary viewpoint of a parallax image have a tradeoff relationship.

In addition, for example, color filters (not shown in FIG. 1) are two-dimensionally arranged on the pixel basis on the light-receiving surface of the image sensor 104. The color filters have a Bayer arrangement in which filters of three primary colors, that is, red (R), green (G), and blue (B) are arranged in a checkered pattern at a ratio of R:G:B=1:2:1. Since such color filters are provided on the light-receiving surface of the image sensor 104, pixels of a plurality of colors corresponding to the colors of the color filters can be obtained.

An A/D conversion unit 105 converts an analog signal (an analog signal (image signal) representing the pixel value of a pixel output from each image sensing element) representing the light amount of the object output from the image sensor 104 into a digital signal.

A signal processing unit 106 performs demosaicing processing, white balance processing, gamma processing, and the like for the digital signal output from the A/D conversion unit 105 to generate the data of the sensed image (sensed image data). The signal processing unit 106 then generates the data of parallax images (parallax image data) based on the pixel size s in one side direction of a pixel on the image sensor 104, the distance L between the aperture stop 102 and the microlens array 103, the effective diameter D of the imaging lens 101, and the distance f between the microlens array 103 and the image sensor 104. Next, the signal processing unit 106 generates image data (display image data) to be displayed on a display unit 116 in accordance with an instruction from an operation unit 113. The parallax image data generation processing and the display image data generation processing will be described later.

An encoder unit 107 performs processing of converting the parallax image data generated by the signal processing unit 106 into a file format such as jpeg or mpeg.

A media interface unit 108 serves as an interface to connect a PC or another medium (for example, a hard disk, a memory card, a CF card, an SSD card, or a USB memory).

A D/A conversion unit 109 converts the parallax image data generated by the signal processing unit 106 into analog data.

A CPU 110 executes processing using computer programs and data stored in a ROM 111 or a RAM 112 to control the operations of the units included in the image sensing apparatus.

The ROM 111 stores the activation program and initial setup data of the image sensing apparatus, computer programs and data to be used by the CPU 110 to execute control the operations of the units of the image sensing apparatus, and various kinds of information to be described from this embodiment as known information.

The RAM 112 has an area to temporarily store the computer programs and data loaded from the ROM 111 and a work area to be used by the CPU 110 and other units to execute processing. That is, the RAM 112 can provide various areas as needed.

The operation unit 113 includes buttons and a mode dial. An operation instruction input by a user operation on the operation unit 113 is sent to the CPU 110. As a matter of course, the CPU 110 may execute some of the functions of the operation unit 113, for example, the function of the mode selection button by displaying a button image on the display screen of the display unit 116 to be described later and causing the user to point out the button image by a finger or the like.

An image sensing system control unit 114 controls the image sensing unit 100 to do focusing, shutter opening, stop adjustment, and the like.

A character generation unit 115 generates characters, graphics, and the like, and can generate, for example, a GUI (Graphical User Interface). The generated characters, graphics, and GUI are displayed on the display screen of the display unit 116 to be described later.

In general, an LCD is widely used as the display unit 116 to display the characters and graphics generated by the character generation unit 115, the display image generated by the signal processing unit 106, or the like. The display unit 116 may have a touch screen function. In that case, some of the functions of the operation unit 113 can be implemented, as described above. Functions other than those of the operation unit 113 can also be implemented, as a matter of course.

Figure 2:
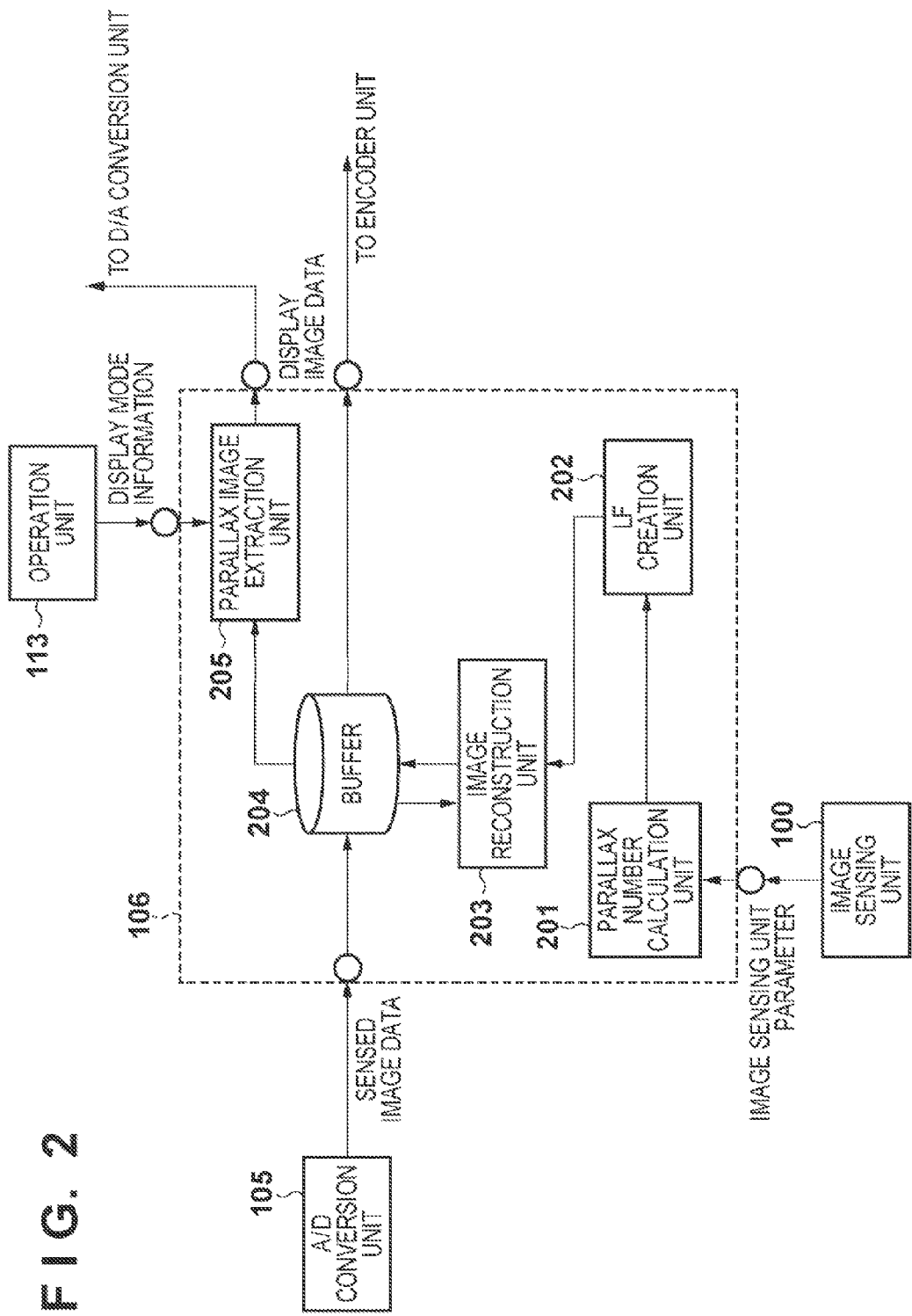
FIG. 2 is a block diagram showing an example of the functional arrangement of a signal processing unit 106.

An example of the arrangement of the signal processing unit 106 will be described next with reference to the block diagram of FIG. 2.

A parallax number calculation unit 201 calculates the number of pixels capable of receiving, on the image sensor, light that has passed through each microlens. The number of pixels capable of receiving, on the image sensor, light that has passed through each microlens will be referred to as a parallax number hereinafter.

An LF creation unit 202 creates the light field of the image sensing apparatus based on the parallax number. The light field represents the correspondence between the passage position of a light beam through the imaging lens and the receiving position of the light on an image sensing element.

An image reconstruction unit 203 rearranges the pixels of the sensed image data held in a buffer 204 based on the light field, thereby generating parallax image data observed from a different viewpoint.

A parallax image extraction unit 205 selects and extracts the parallax image data based on the display mode information of the operation unit 113 and transmits the parallax image data to the encoder unit 107 and the D/A conversion unit 109.

<Operation of Image Sensing Apparatus>

Figure 5:
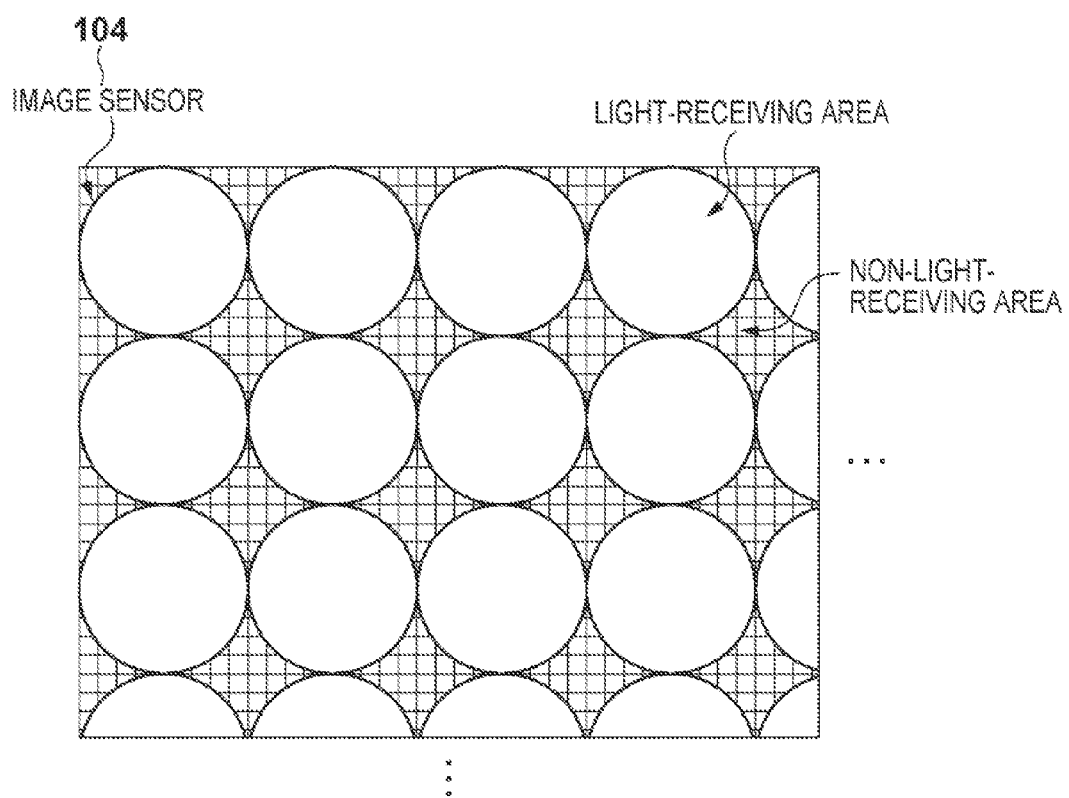
FIG. 5 is a view showing an example of light-receiving areas for the respective microlenses on the light-receiving surface of an image sensor 104.

The operation of the image sensing apparatus according to this embodiment will be described next. Light (object image) that has become incident on the microlens array 103 through the imaging lens 101 and the aperture stop 102 forms an image on the light-receiving surface of the image sensor 104 in accordance with the shape of each microlens. That is, an area (light-receiving area) where the light that has passed through a microlens is received is formed for each microlens on the light-receiving surface of the image sensor 104. FIG. 5 shows an example of light-receiving areas for the respective microlenses on the light-receiving surface of the image sensor 104.

Since the opening portion of the aperture stop 102 is circular, as shown in FIG. 3, a circular light-receiving area is formed on the light-receiving surface of the image sensor 104 in correspondence with each microlens. At this time, light beams incident on the microlens array 103 are received at different positions on the light-receiving surface of the image sensor 104 in accordance with their incidence positions on the imaging lens 101.

Each image sensing element of the image sensor 104 outputs an analog signal corresponding to the received light amount. As a result, the image sensor 104 outputs an analog signal for each pixel. The A/D conversion unit 105 converts (A/D-converts) the analog signal of each pixel into a digital signal, thereby generating a digital signal for each pixel. This A/D conversion can be general processing. For example, the light amount of the object is photoelectrically converted into a signal and then converted into a digital signal representing a 14-bit digital value.

Figure 6:
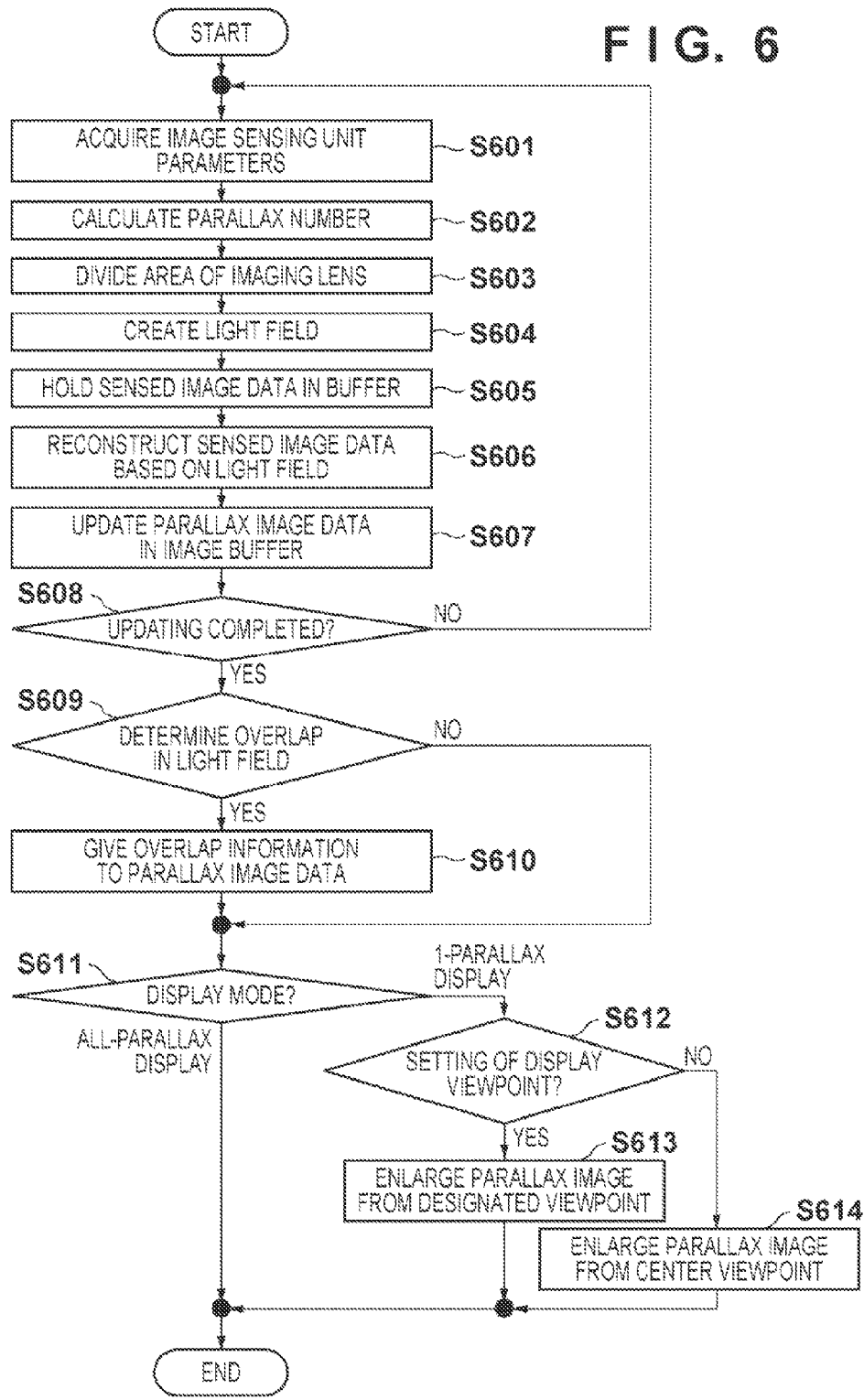
FIG. 6 is a flowchart of processing to be performed by the signal processing unit 106.

Next, the signal processing unit 106 performs demosaicing processing for a general Bayer arrangement, white balance processing, and gamma processing for the digital signal of each pixel converted by the A/D conversion unit 105 to generate sensed image data. The signal processing unit 106 reconstructs the sensed image data to parallax image data based on the light field, and generates display image data to be displayed on the display unit 116. The parallax image data generation processing and the display image data generation processing will be described with reference to the flowchart of FIG. 6.

In step S601, the parallax number calculation unit 201 acquires image sensing unit parameters from the image sensing unit 100. The image sensing unit parameters are the pixel size s in one side direction of a pixel on an image sensing element, the distance L between the aperture stop 102 and the microlens array 103, the effective diameter D of the imaging lens 101, and the distance f between the microlens array 103 and the image sensor 104. Acquiring the image sensing unit parameters from the image sensing unit 100 has been described above. However, for example, the image sensing unit parameters may be stored in the ROM 111 in advance, and the parallax number calculation unit 201 may acquire the image sensing unit parameters from the ROM 111. Alternatively, a parameter input field may be displayed on the display unit 116, and the values the user inputs to the parameter input field by operating the operation unit 113 may be used as the image sensing unit parameters. Otherwise, for example, an effective diameter D0 of the aperture stop 102 in the full-aperture state may be stored in the ROM 111. When an F-number Fnum of the stop is obtained, the effective diameter D may be obtained by calculating $$D = D0/Fnum \qquad (2)$$

The distance L between the aperture stop 102 and the microlens array 103 or the distance f between the microlens array 103 and the image sensor 104 may be detected using a radar device provided for distance measurement. Note that the image sensing unit parameters may be reacquired when, for example, the stop or the distance between the imaging lens 101 and the microlens array 103 or the image sensor 104 has changed.

In step S602, the parallax number calculation unit 201 calculates the parallax number based on the image sensing unit parameters acquired in step S601. FIG. 4 shows the image sensing unit parameters and the positional relationship between the imaging lens 101, the aperture stop 102, the microlens array 103, and the image sensor 104. At this time, the number m of elements for receiving light from each microlens is given by $$m \times s : f = D : L \qquad (3)$$
$$m = \frac{Ls}{Df}$$

where m is a positive integer.

The number m×n of elements for receiving light on the image sensing elements is calculated from equations (3). The parallax number calculation unit 201 sends the number m×n of elements to the LF creation unit 202 as the parallax number of the image sensing apparatus according to this embodiment. Note that the parallax number calculation is merely an example of one form of the image sensing apparatus holding a lens array, and the present invention is not limited to this. For example, the parallax number may be acquired from the ROM 111. When the image sensing unit parameters are reacquired, the parallax number is also recalculated.

Figure 7:
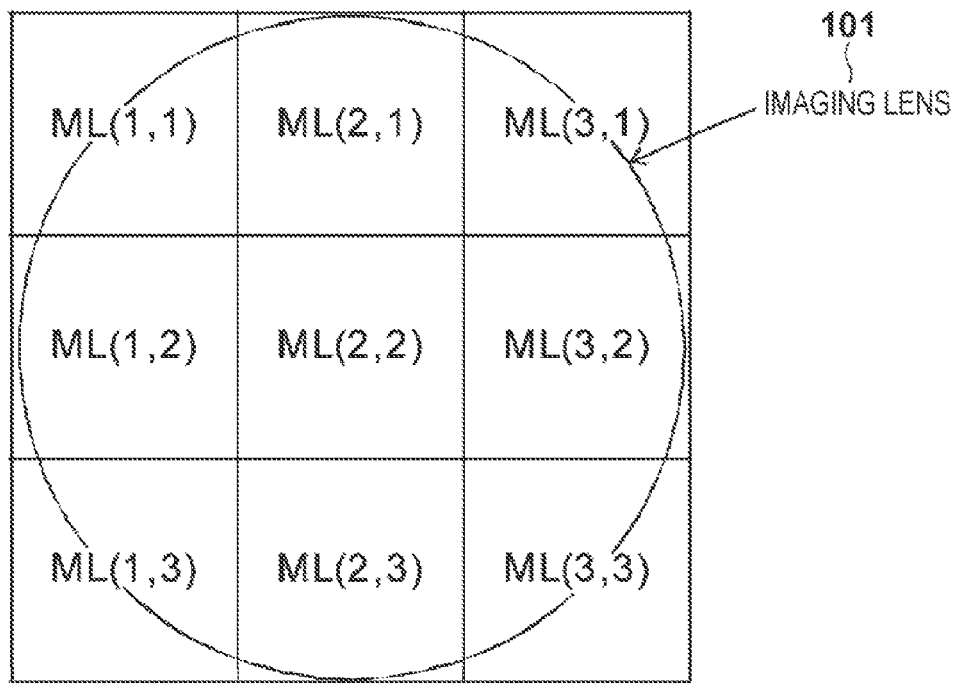
FIG. 7 is a view showing examples of area division and the indices of areas of an imaging lens 101 when m=3, and n=3.

In step S603, the LF creation unit 202 divides the imaging lens 101 into areas based on the parallax number and assigns an index to each area. The number of elements for receiving light for each microlens, which is calculated by the parallax number calculation unit 201, is the parallax number. Hence, when the parallax number is m×n, the imaging lens is divided into m×n areas, and indices ML(1,1), ML(2,1), ..., ML(m,n) are assigned to the areas, respectively. For example, FIG. 7 illustrates an example of area division and the indices of areas of the imaging lens 101 when m=3, and n=3.

Figure 8:
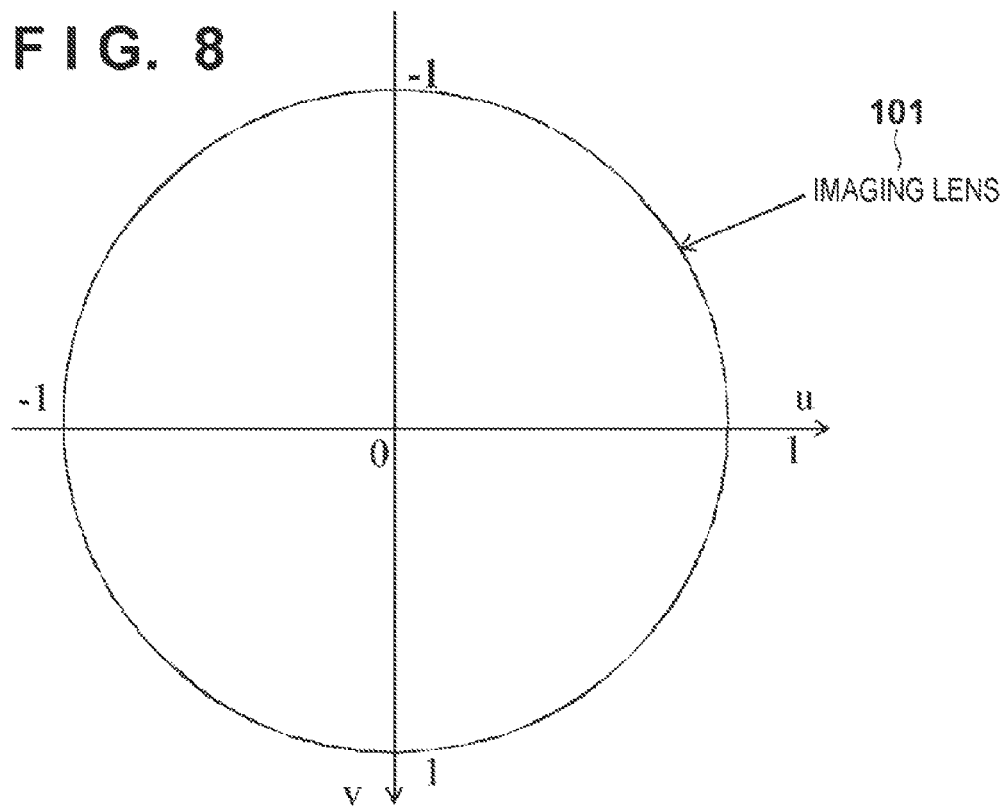
FIG. 8 is a view for explaining coordinates (u,v) on the imaging lens.
Figure 10:
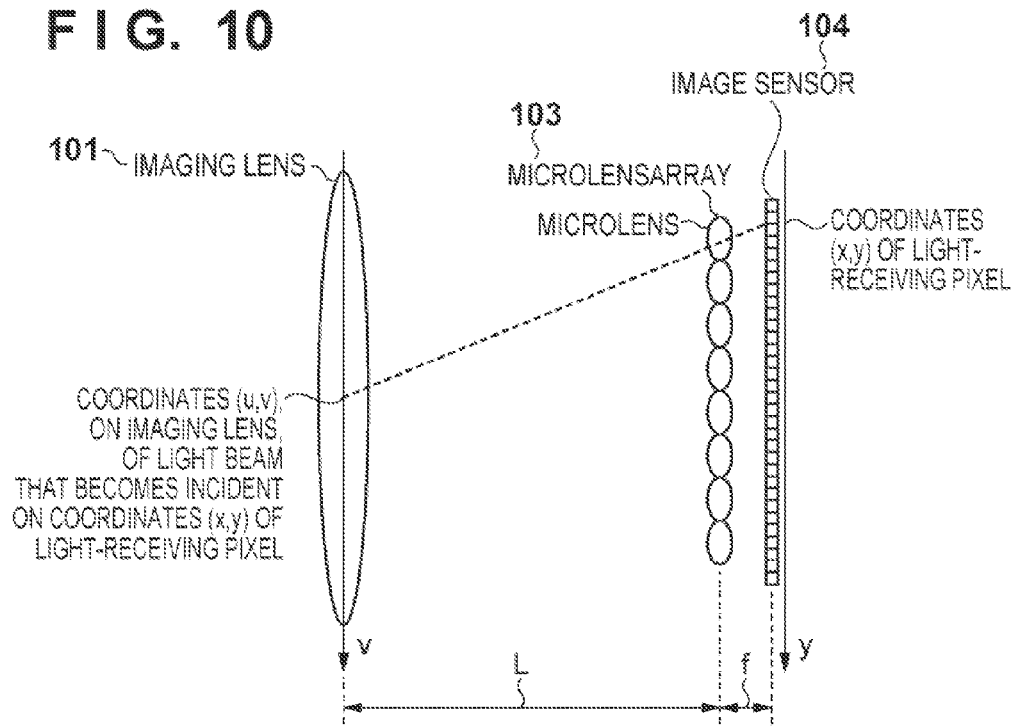
FIG. 10 is a view for explaining a light field creation method.

In step S604, based on the image sensing unit parameters and area division of the imaging lens, the LF creation unit 202 creates a light field that is a list in which the correspondence between coordinates (x,y) of each image sensing element and coordinates (u,v), on the imaging lens 101, of a light beam that becomes incident on the image sensing element is registered. As shown in FIG. 8, the coordinates (u,v) on the imaging lens are defined on a coordinate system including the imaging lens while placing the origin at the center of the imaging lens. For example, assume that the u-v coordinate system ranges from −1 to 1, as shown in FIG. 8. The created light field is a table of the coordinates (u,v) corresponding to the coordinates (x,y) of each pixel and the index of the divided area including the coordinates (u,v), as shown in FIG. 9. For the light field of the image sensing apparatus, a line is drawn from a pixel to the center of a microlens, as shown in FIG. 10, thereby acquiring the coordinates (u,v) of the passage point on the imaging lens as the coordinates corresponding to the pixel. This operation is performed for all pixels to create the light field. Note that the light field shown in FIG. 10 is merely an example for the positional relationship of the components in the image sensing unit 100. The present invention is not limited to this as far as the light field represents the correspondence between the coordinates (u,v) on the imaging lens 101 and the coordinates (x,y) of the pixel on the image sensor 104. The light field may be recreated when the distance L between the aperture stop 102 and the microlens array 103 or the distance f between the microlens array 103 and the image sensor 104 in the image sensing unit 100 has changed.

In step S605, the digital signal input from the A/D conversion unit 105 is stored in the buffer 204 as sensed image data.

In step S606, the image reconstruction unit 203 reconstructs the sensed image data held in the buffer 204 into parallax image data based on the light field obtained from the LF creation unit 202. More specifically, the pixels in the sensed image data are rearranged so that u of the coordinates (u,v) in the light field increases from left to right, and v increases from above to below. That is, when the coordinates of a pixel after rearrangement are represented by (x',y'), rearrangement is done by $$(x',y') = (u,v) \qquad (4)$$

Figure 12A:
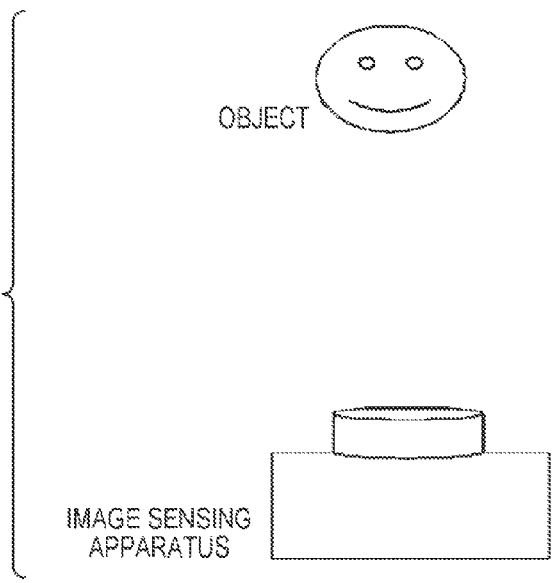
FIGS. 12A and 12B are views showing an example of parallax image creation.
Figure 12B:
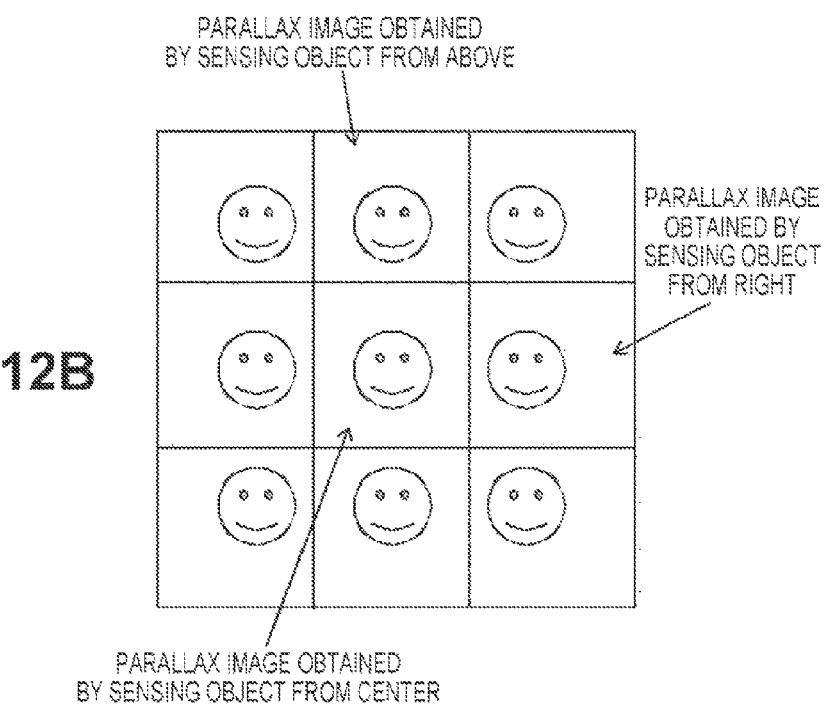

This allows to reconstruct parallax image data having parallaxes as many as the divided areas of the imaging lens. Parallax images indicate an image group with parallaxes including, when an object as shown in FIG. 12A is sensed, the image of the object sensed from the upper side with respect to the center and the image of the object sensed from the right side, as shown in FIG. 12B.

In step S607, the image reconstruction unit 203 stores the reconstructed parallax image data in the buffer 204. If parallax image data is already stored in the buffer 204, the image reconstruction unit 203 updates the already stored parallax image data. The image reconstruction unit 203 also stores the light field in the buffer 204.

In step S608, the image reconstruction unit 203 determines whether there is a change in the image sensing unit parameters of the light field. Upon determining that there is no change, the updating is determined to be completed, and the process advances to step S609. Upon determining that there is a change in the image sensing unit parameters, the process returns to step S601.

Figure 13:
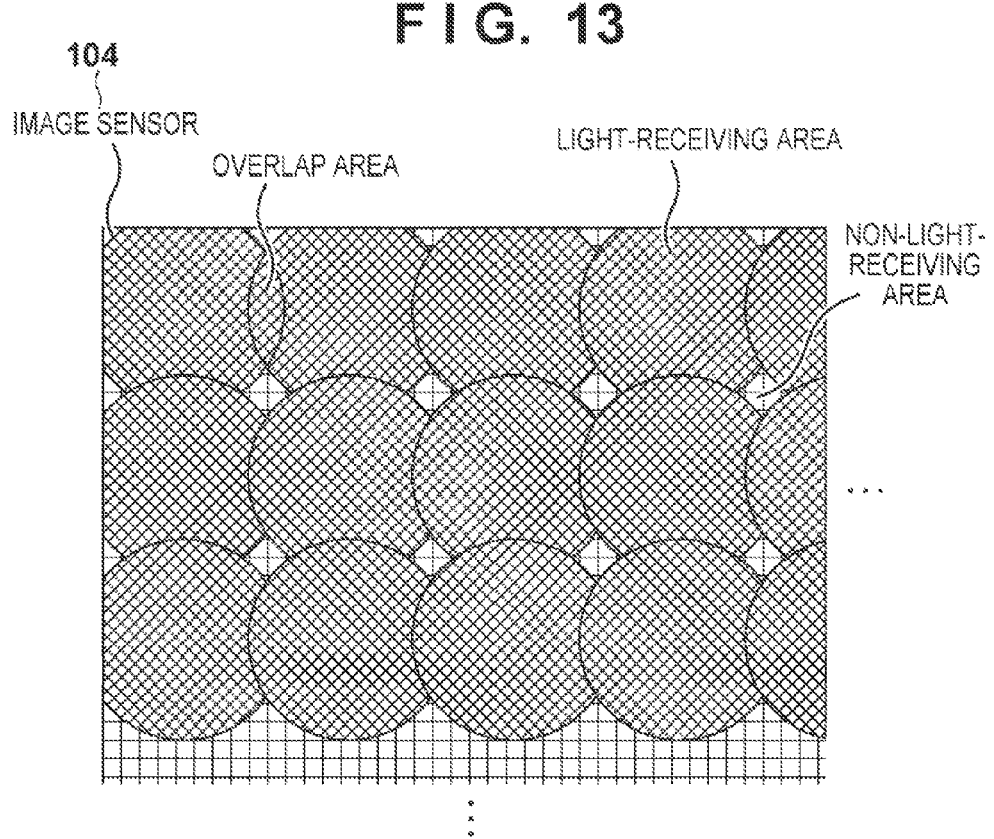
FIG. 13 is a view showing an example of the light-receiving areas of microlenses on the light-receiving surface of the image sensor 104.

In step S609, the image reconstruction unit 203 performs overlap determination in the light field. In the overlap determination, it is determined whether the imaging lens has two or more kinds of coordinates corresponding to each pixel. Upon determining that overlap exists, the process advances to step S610. Upon determining that no overlap exists, the process advances to step S611. For example, assume that the image sensor 104 has light-receiving areas in the state shown in FIG. 13. As shown in FIG. 13, when each light-receiving area is wide, overlap areas are generated.

Figure 14:
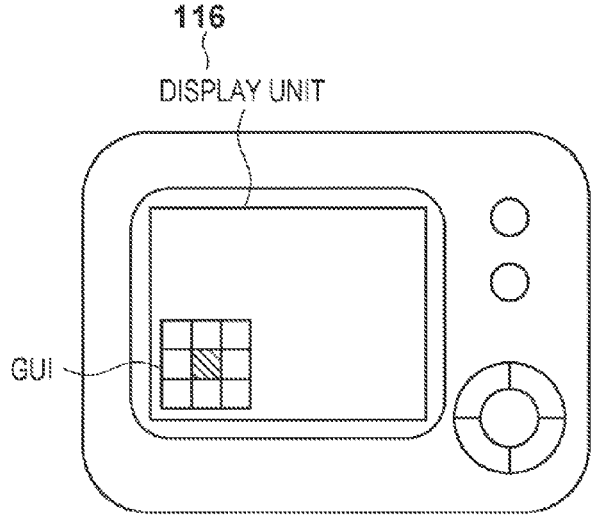
FIG. 14 is a view showing a display example on the display screen of a display unit 116.

In step S610, the image reconstruction unit 203 gives overlap information representing existence of overlap to a light field corresponding to a pixel determined as overlap and updates the light field in the buffer 204. In step S611, the parallax image extraction unit 205 confirms the currently set display mode. The user can set any one of the display modes by operating the operation unit 113. More specifically, when the user inputs an instruction to select a display mode using the operation unit 113, the character generation unit 115 generates a display mode selection screen (GUI) and displays it on the display screen of the display unit 116. FIG. 14 shows a display example on the display screen of the display unit 116.

The 3×3 matrix shown as a GUI corresponds to 3×3 parallax images. For example, pointing out the rectangle at the upper left corner using the operation unit 113 makes it possible to designate a parallax image ML(−1,−1) obtained by sensing the object from upper left. In this way, pointing out a rectangle ith ($1 \leq i \leq 3$ in FIG. 14) rightward from upper left and jth ($1 \leq j \leq 3$ in FIG. 14) downward using the operation unit 113 allows to designate a parallax image ML(−2+i,−2+j). The parallax image designation method and the arrangement of the GUI therefor are not limited to those described above, as a matter of course.

When the user points out one rectangle using the operation unit 113 a parallax image corresponding to the pointed position is designated, and a 1-parallax display mode is set. When the user instructs to select all rectangles (all rectangles of the GUI) using the operation unit 113, an all-parallax display mode is set. Note that the method of setting the 1-parallax display mode or the all-parallax display mode is not limited to this. Alternatively, for example, one of the all-parallax display mode and the 1-parallax display mode may be selected using a check box generated by the character generation unit 115. In the above-described example, two display modes are selectable. However, the present invention is not limited to this. There may also exist a mode to select and display several parallax images.

Anyway, when the user sets a display mode using the operation unit 113, data representing the set display mode (when the 1-parallax display mode is set, the data includes data representing the designated parallax image) is written in the RAM 112. Hence, in step S611, the data written in the RAM 112 to represent the display mode is referred to, and which display mode is represented by the data is determined.

Figure 11:
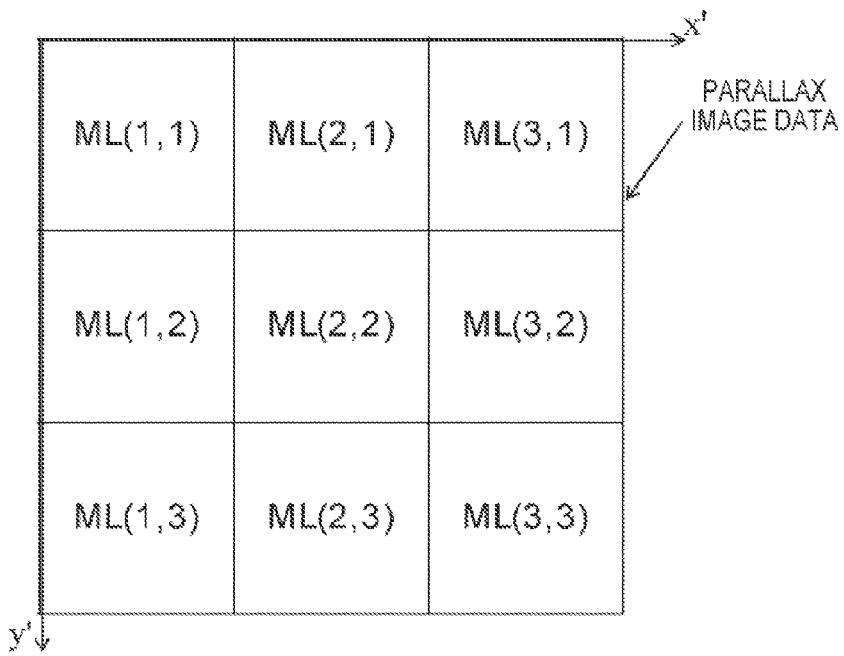
FIG. 11 is a view showing an example of the arrangement of parallax images.

Upon determining in step S611 that the 1-parallax display mode is set, the process advances to step S612. When the all-parallax display mode is set, the parallax image extraction unit 205 directly arranges the parallax image data for each parallax, as shown in FIG. 11, and outputs it to the encoder unit 107 and the D/A conversion unit 109 as display image data.

How to arrange and display the parallax images is not limited to that described above, as a matter of course. For example, when the parallax images are arranged as shown in FIG. 11, some of the parallax images may be extracted and arranged as display images. A parallax image having an average pixel value equal to or smaller than a given threshold may be excluded from the display target because it is "too dark".

FIG. 15 illustrates an example in which all parallax images are arranged in accordance with extraction start coordinates when m=5 and n=5. At this time, when the opening portion of the aperture stop 102 is circular, as shown in FIG. 3, non-light-receiving areas where light receiving does not occur are generated on the image sensor 104, as shown in FIG. 5. Referring to FIG. 15, the parallax images (hatched portions in FIG. 15) to be listed below are formed from pixels extracted from the non-light-receiving areas and are therefore darker than the remaining parallax images.

Display image data areas ML(1,1), ML(2,1), ML(4,1), ML(5,1), ML(1,2), ML(5,2), ML(1,4), ML(5,4), ML(1,5), ML(2,5), ML(4,5), and ML(5,5)

Only parallax images each having an average pixel value equal to or larger than a threshold may be arranged, as shown in FIG. 16, and displayed on the display screen of the display unit 116. A dark parallax image may be displayed after made lighter by multiplying each pixel value by a gain. Alternatively, parallax images in the neighborhood may be added.

Figures 17, 18:
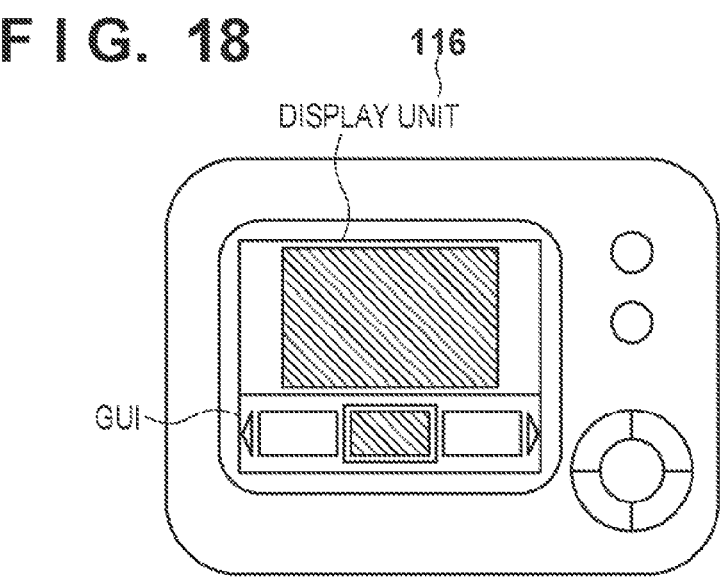
FIG. 17 is a view showing an example of the arrangement of parallax images.
FIG. 18 is a view showing a display example of a GUI.
Figure 19:
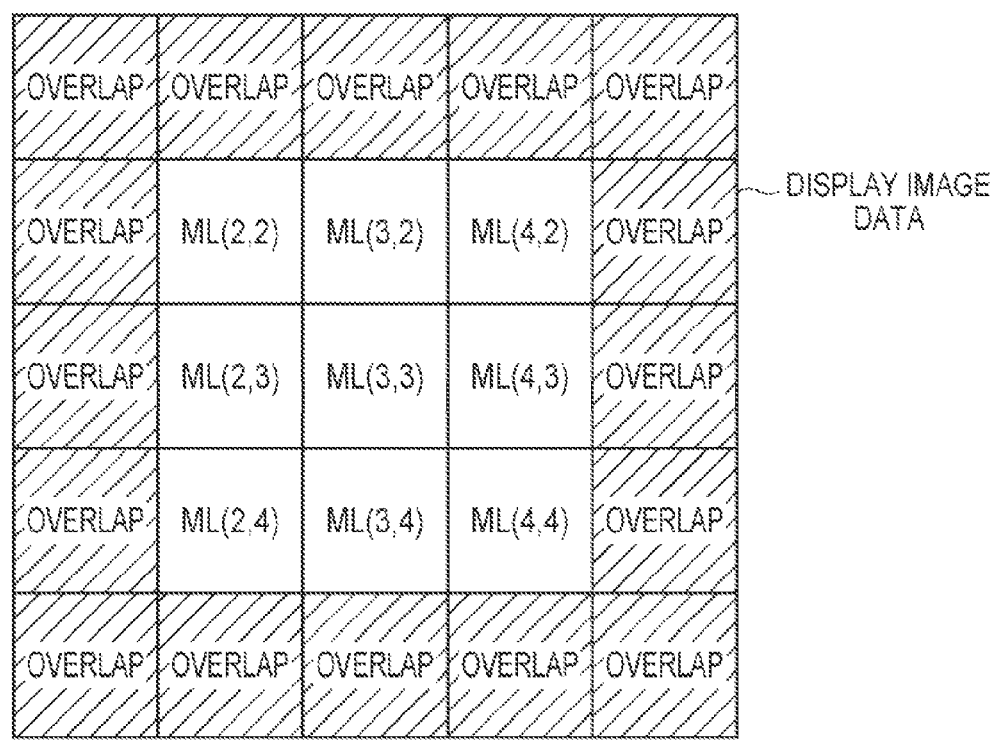
FIG. 19 is a view showing an example of the arrangement of parallax images.

Alternatively, as shown in FIG. 17, the parallax images may be extracted, arranged and enlarged to 3×3, and thus displayed on the display screen of the display unit 116. A parallax image given overlap information in step S610 may be excluded from the display target. For a parallax image given overlap information, "information representing occurrence of overlap" may be displayed in place of the parallax image, as shown in FIG. 19.

Referring back to FIG. 6, in step S612, the parallax image extraction unit 205 determines whether to refer to the "data representing the designated parallax image" included in the data representing the 1-parallax display mode. Whether to refer the data can be either preset or selected by the user. To refer to the data, the process advances to step S613. Not to refer, the process advances to step S614. When an instruction to select the 1-parallax display mode is simply input using a GUI than the above-described matrix GUI, there exists no data representing a designated parallax image. In this case, the process advances to step S614.

In step S613, the parallax image extraction unit 205 enlarges the designated parallax image as needed, and outputs the enlarged parallax image data to the D/A conversion unit 109 as display image data. For example, in FIG. 11, when the rectangle at the upper left corner is pointed out on the 3×3 matrix GUI of the above-described example, the parallax image data ML(1,1) is extracted, enlarged as needed, and output to the D/A conversion unit 109. A known enlarging method such as a bicubic method is usable. The scaling factor of enlargement is calculated from the number of pixels of the display screen of the display unit 116. The enlargement processing is not essential, and reduction may be performed in place of enlargement, as a matter of course.

The operation on the GUI (switching the display target parallax image) may be done during display image display on the display unit 116. For example, when the user points out another parallax image using the operation unit 113 during display of a display image on the display unit 116, a display image is generated from the designated parallax image and output to the D/A conversion unit 109.

Note that the display configuration on the display screen of the display unit 116 is not limited to the above-described example. For example, a GUI as shown in FIG. 18 may be displayed on the display unit 116 to display a display image on the upper side of the display unit 116 and a parallax image on the lower side and cause the user to select a parallax image on the lower side. In the GUI shown in FIG. 18, each parallax image data generated in step S607 is reduced and arranged on the lower side of the display unit 116, and the selected parallax image is enlarged and displayed on the upper side. Selection of a parallax image given overlap information may be prohibited. The parallax image data may directly be arranged for each parallax, as shown in FIG. 11, and output to the encoder unit 107 and the D/A conversion unit 109 as display image data.

In step S614, the parallax image extraction unit 205 enlarges an area ML located at the center of the parallax image data, as needed, as in step S613, and outputs the enlarged parallax image to the D/A conversion unit 109 as a display image. The enlargement processing is not essential, and reduction may be performed in place of enlargement, as a matter of course.

Note that the display unit 116 displays the display image data received from the D/A conversion unit 109 as a display image on, for example, an LCD.

Figure 20A:
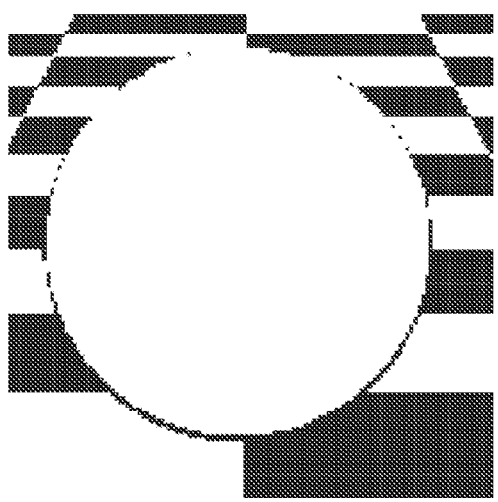
FIGS. 20A to 20C are views for explaining the effect of the first embodiment.
Figure 20B:
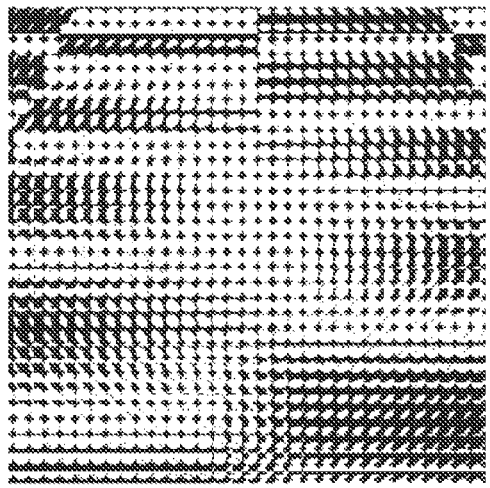
Figure 20C:
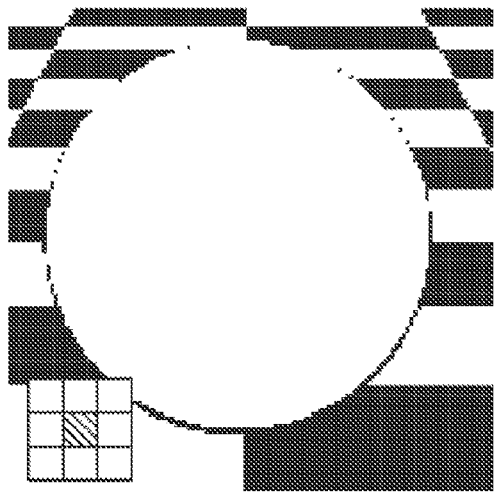

As described above, according to this embodiment, the user can confirm via the display unit 116 whether a parallax image acquired by the image sensing apparatus including the microlens array 103 is in focus. For example, when the object is a planar chart as shown in FIG. 20A, a display image as shown in FIG. 20B is conventionally obtained through the microlens array 103. Hence, it is impossible to confirm whether the planar chart is in focus. However, according to this embodiment, the image of the center viewpoint or the like is enlarged and displayed, as shown in FIG. 20C. This allows to confirm whether the planar chart is in focus.

[Second Embodiment]

The series of processes described in the first embodiment are performed at a predetermined time interval to update the display image in real time, thereby implementing live view display. In addition, every time an assigned pixel number calculation parameter or the lens position is updated, the above-described processing is performed. This makes it possible to reflect the influence of the focal length, the aperture stop, and the movement of the lens and image sensing elements upon shooting on the display image in real time. For example, when the focal length or an aperture stop 102 changes, the light-receiving area on an image sensor 104 changes.

Figures 21, 22:
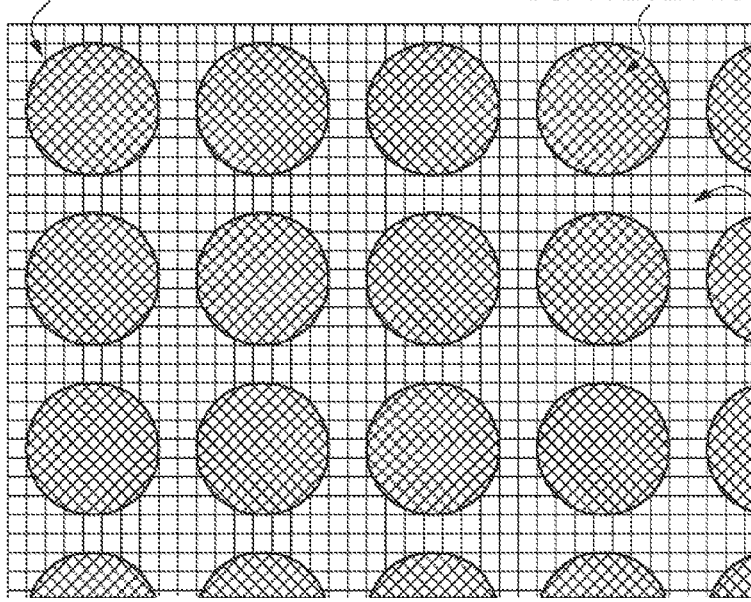
FIG. 21 is a schematic view of light-receiving areas on the image sensor 104 when the aperture stop 102 is stopped down.
FIG. 22 is a view showing parallax images when the parallax number is 5×5.

FIG. 21 is a schematic view of light-receiving areas on the image sensor 104 when the aperture stop 102 is stopped down. FIG. 13 is a schematic view of light-receiving areas when the aperture stop 102 is opened. At this time, since the image sensing unit parameter changes, the procedure of a signal processing unit 106 is performed from step S601 again to create a new light field and thus cope with the change. For example, when the aperture stop 102 is stopped down, the light-receiving areas become smaller, as shown in FIG. 21. Hence, the parallax number m×n decreases as can be seen from equations (2) and (3). Assume that the parallax number of parallax image data is 5×5, and this decreases to 3×3 when the aperture stop is stopped down. At this time, the light field is recreated. The parallax number of the parallax image data decreases from that in FIG. 22 to that in FIG. 23. As described above, even when the light-receiving areas are narrowed by, for example, stopping down the aperture stop 102 or increasing a distance L, the parallax image data can correctly be generated.

When the aperture stop 102 is opened to widen the light-receiving areas on the image sensor 104, the parallax number m×n increases as is apparent from equations (2) and (3). For example, when the parallax number increases from 5×5 to 7×7, parallax image data as shown in FIG. 24 is obtained. As described above, even when the light-receiving areas are widened by, for example, opening the aperture stop or shortening the distance L, the parallax image data can correctly be generated.

In the above-described embodiment, the in-focus state can be confirmed by displaying a parallax image. However, the image can also be used for another purpose, as a matter of course. For example, contrast AF processing may be done from a CPU 110 and an image sensing system control unit 114 using a display image.

The processing has been described above concerning an image sensing apparatus which can change the focal length and move the aperture stop 102, the imaging lens 101, and the image sensor 104. However, this does not apply in an image sensing apparatus that uses a single focal point or a single aperture stop and does not change the size of each light-receiving area on the image sensor 104. In this image sensing apparatus, the light field may be held in a ROM 111 or the like in advance because it is not recreated from the image sensing unit parameters. The same processing can be done even in an image sensing apparatus which does not change the light field because of the positional relationship in an image sensing unit 100 regardless of the aperture state of the aperture stop. Processing after light field creating is the same as that from step S605.

[Third Embodiment]

In this embodiment, an example will be explained in which display is performed to allow the user to easily confirm whether focus adjustment processing (to be referred to as refocus hereinafter) after shooting, which is to be performed by an image sensing apparatus holding a lens array, is possible. Points different from the first embodiment will mainly be described below.

<Example of Arrangement of Image Sensing Apparatus>

Figure 25:
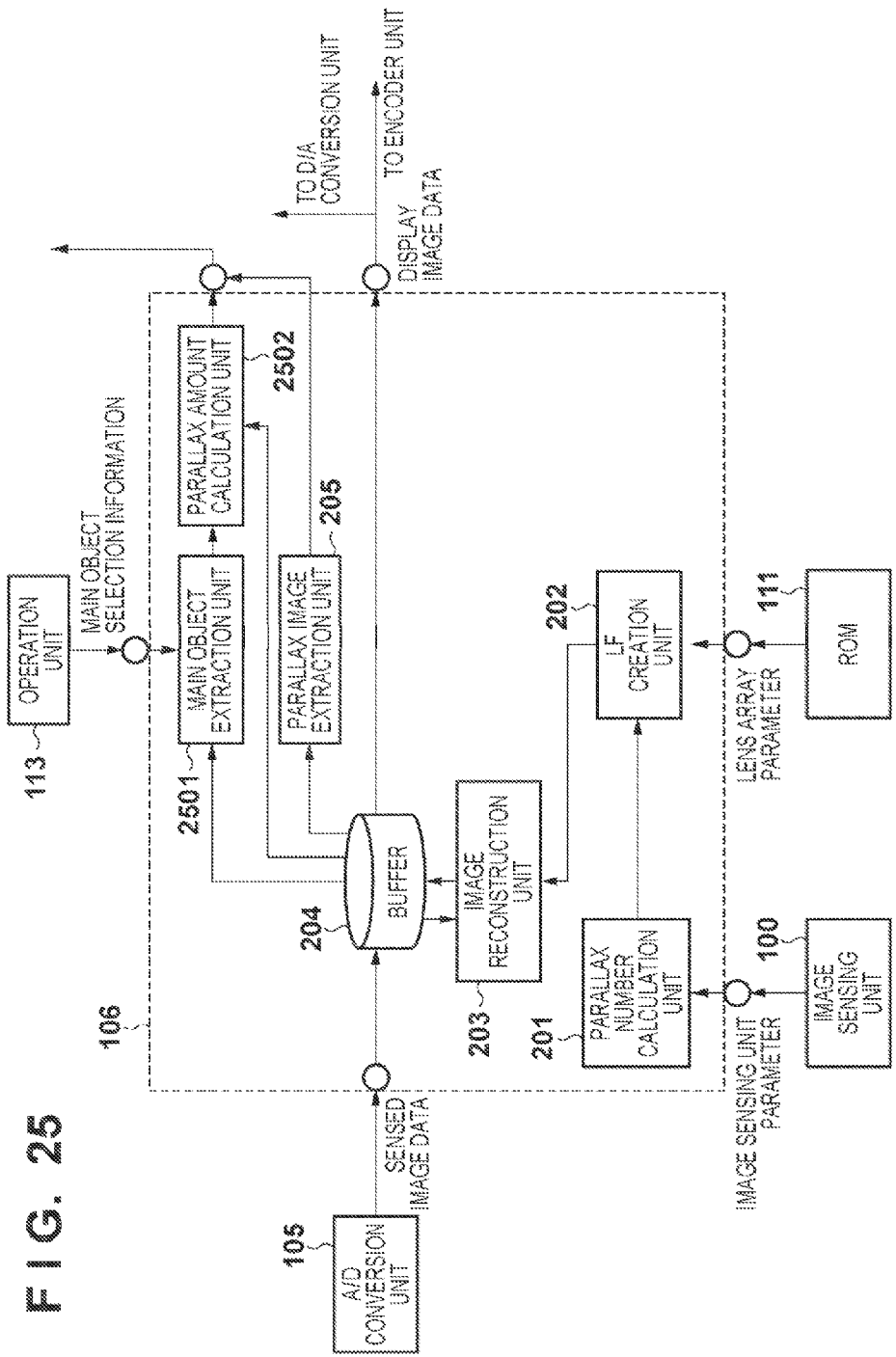
FIG. 25 is a block diagram showing an example of the functional arrangement of a signal processing unit 106.

FIG. 25 is a block diagram showing an example of the functional arrangement of a signal processing unit 106 according to this embodiment. The signal processing unit 106 includes a parallax number calculation unit 201, an LF creation unit 202, an image reconstruction unit 203, a buffer 204, a parallax image extraction unit 205, a main object extraction unit 2501, and a parallax amount calculation unit 2502.

The parallax number calculation unit 201, the LF creation unit 202, the image reconstruction unit 203, and the buffer 204 are the same as in the first embodiment, and a description thereof will not be repeated.

The parallax image extraction unit 205 extracts a parallax image from the center viewpoint of parallax image data stored in the buffer 204, enlarges the parallax image, and sends it to a D/A conversion unit 109.

The main object extraction unit 2501 acquires the information of the main object designated by the user via an operation unit 113 or the touch panel of a display unit 116, and extracts the main object from each parallax image data.

The parallax amount calculation unit 2502 calculates the barycentric coordinates of the main object on each parallax image coordinate system from the main object extracted from each parallax image data, and calculates the parallax amount based on the distance between the barycentric coordinates and those of the parallax image of the center viewpoint. Next, it is determined based on the parallax amount whether the main object has a parallax sufficient for refocus. Then, refocus determination information is generated from each parallax image including the main object and its parallax amount, gives the information to the parallax image, and transmits it to the D/A conversion unit 109.

<Operation of Image Sensing Apparatus>

The operation of the image sensing apparatus according to this embodiment will be described next.

Figure 26:
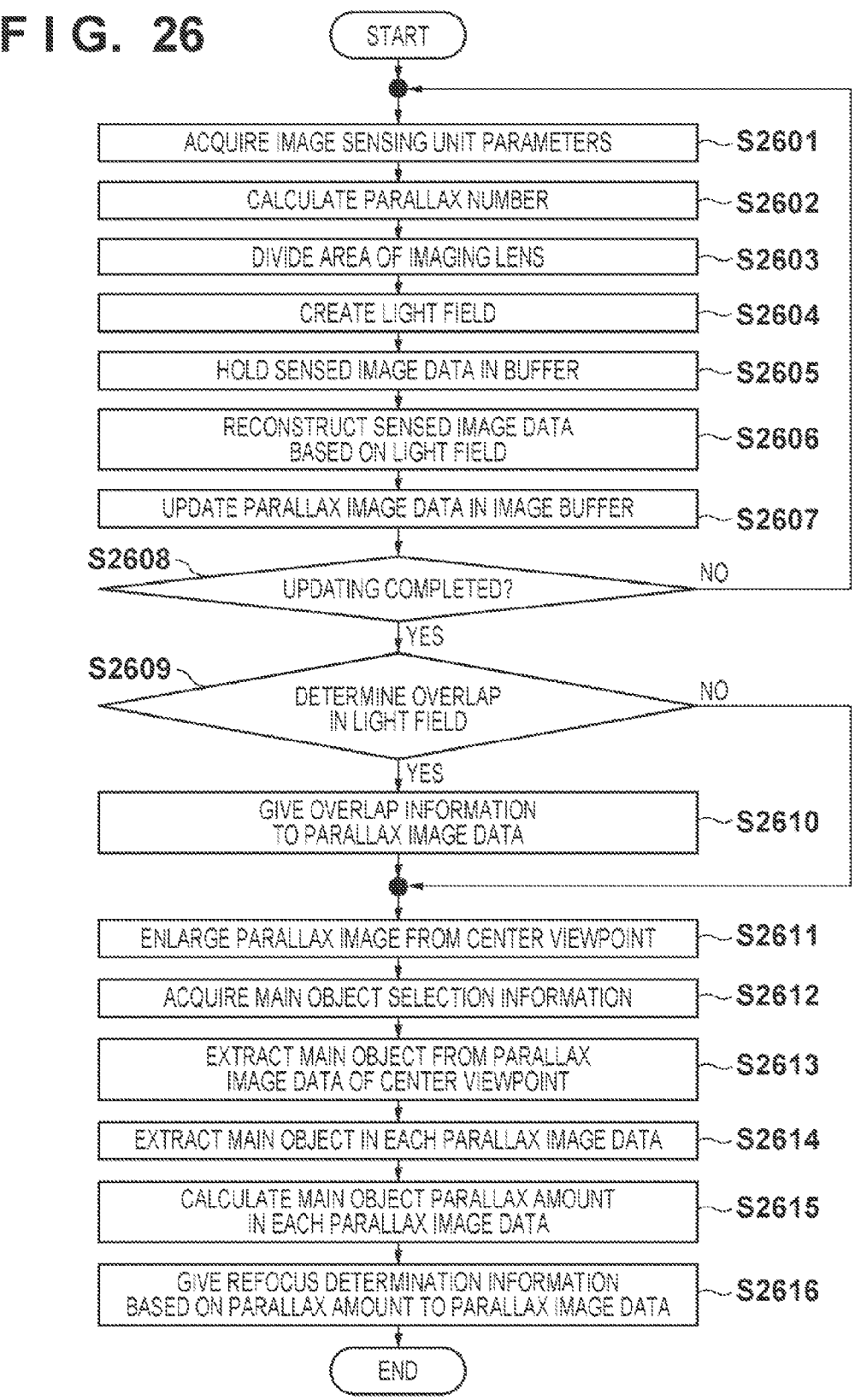
FIG. 26 is a flowchart of refocus evaluation information generation processing.

Processing up to sensed image data generation of the signal processing unit 106 is the same as in the first embodiment, and a description thereof will not be repeated. Refocus evaluation information generation processing will be described below with reference to the flowchart of FIG. 26.

The processes of steps S2601 to S2610 are the same as those of steps S601 to S610 described above, and a description thereof will not be repeated.

In step S2611, the parallax image extraction unit 205 extracts the parallax image of the center viewpoint of the parallax image data, enlarges the parallax image, and transmits it to the D/A conversion unit 109. In addition, a message to cause the user to select the main object is displayed on the display unit 116.

Figure 27:
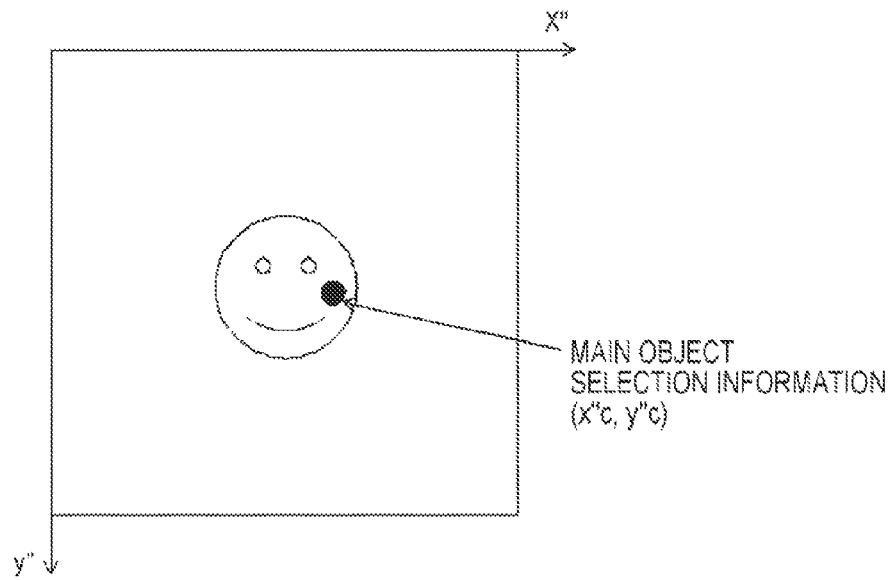
FIG. 27 is a view for explaining processing of acquiring main object selection information.

In step S2612, the main object extraction unit 2501 acquires main object selection information from the operation unit 113. The main object selection information is a point (x"c,y"c) in the x"-y" coordinate system of the parallax image data of the center viewpoint, which is selected by the user using the operation unit 113 from the parallax image of the center viewpoint displayed on the display unit 116 in step S2611. For example, assume that a face image is sensed in the parallax image data of the center viewpoint, as shown in FIG. 27. When the user designates the point indicated by a full circle and designates the face as the main object, the x"y" coordinates of the full circle are stored in a RAM 112 as the main object selection information. The main object extraction unit 2501 acquires this information.

Figure 28:
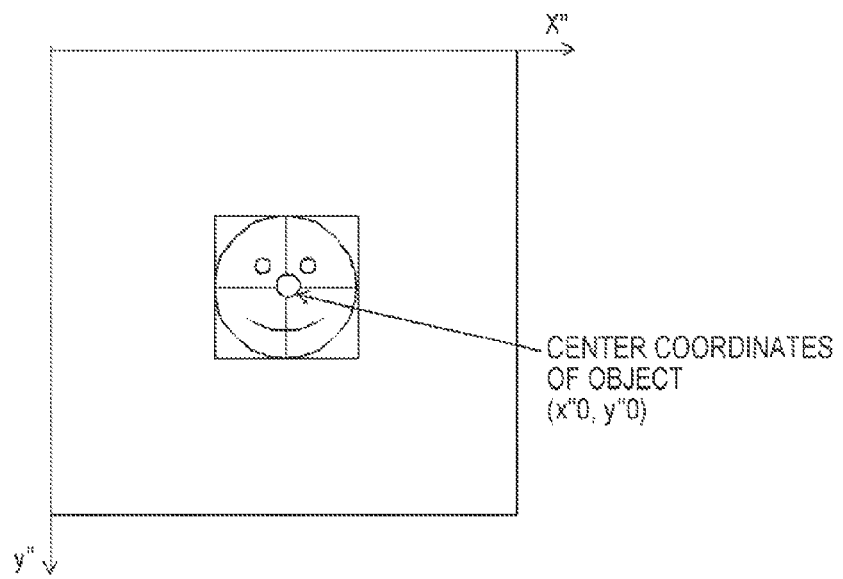
FIG. 28 is a view for explaining central coordinates.

In step S2613, the main object extraction unit 2501 acquires the parallax image data of the center viewpoint from the buffer 204, extracts the object based on the main object selection information, and calculates the center coordinates (x"0,y"0) of the extracted object. The center coordinates are obtained by surrounding the object by a rectangle and defining the center of the rectangle, as shown in FIG. 28. Note that object extraction can be done by a known method.

In step S2614, the main object extraction unit 2501 acquires parallax image data other that of the center viewpoint from the buffer 204, and extracts the object extracted in step S2613 from each parallax image data. Note that extraction can be done by a known method such as pattern matching. Next, the center coordinates (x"1,y"1), (x"2,y"2), (x"3,y"3), . . . of the object are calculated for the respective parallax images, as in step S2613. The main object extraction unit 2501 then sends the center coordinates of all parallax images from which the object can be extracted to the parallax amount calculation unit 2502.

In step S2615, the parallax amount calculation unit 2502 calculates the parallax amount of each parallax image including the object designated by the user. For example, a parallax amount E1 of the parallax image having the object center coordinates (x"1,y"1) is calculated by $$E1 = \sqrt{(x''1-x''0)^2 + (y''1-y''0)^2} \quad (5)$$

In a similar manner, parallax amounts E2, E3, . . . are calculated for the parallax images from which the object can be extracted.

In step S2616, the parallax amount calculation unit 2502 generates refocus evaluation information based on each parallax amount calculated in step S2615, and gives the refocus evaluation information to corresponding parallax image data. All parallax image data are transmitted to the D/A conversion unit 109 as display image data. The refocus evaluation information is 1-bit information ○ or x. When the object exists in the parallax image, and the parallax amount of the parallax image data is larger than a threshold Th necessary and sufficient for refocus, refocus evaluation information ○ is given to the parallax image data. When the parallax amount is smaller than the threshold Th, refocus evaluation information x is given to the parallax image data. The refocus evaluation information determination condition is not limited to that described above. The threshold Th may be increased as the parallax image data is farther apart from the parallax image data of the center viewpoint. In the above-described example, only the scalar quantity of the parallax amount is used as the determination condition. However, a direction may be combined. For example, when parallax image data is located above the parallax image data of the center viewpoint, the parallax amount vector of the object needs to be upward. Hence, whether the vector is upward may be determined.

Figure 29:
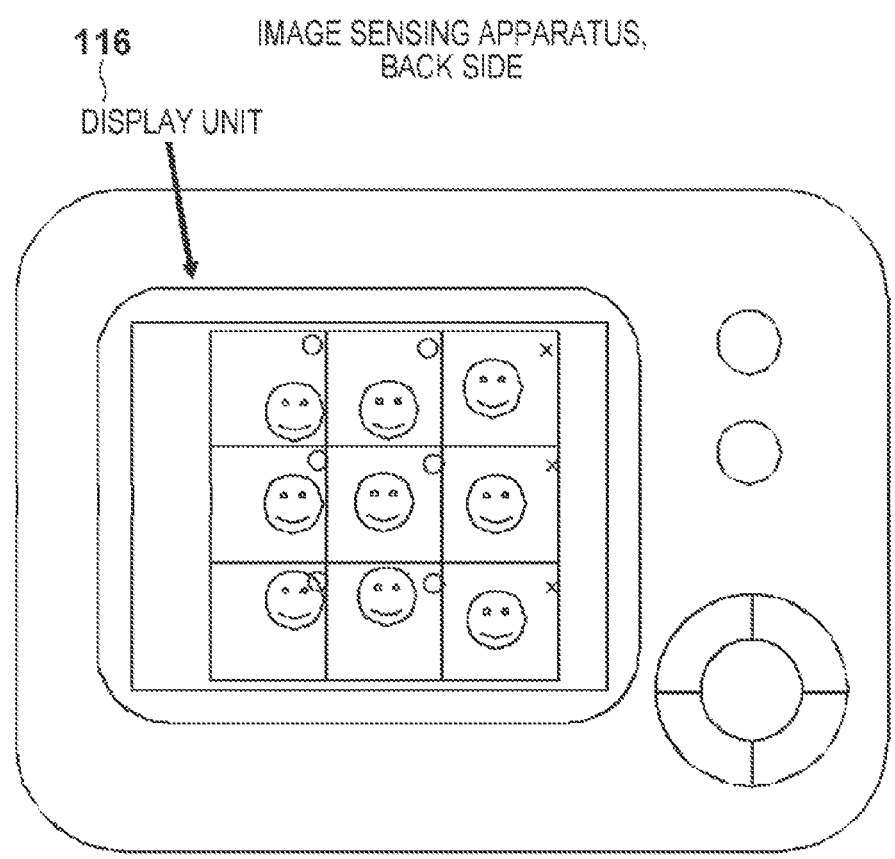
FIG. 29 is a view showing a display example on a display unit 116.

Next, the display unit 116 displays display image data on, for example, an LCD as a display image. The images may be displayed in, for example, the all-parallax mode, as shown in FIG. 29. At this time, the refocus evaluation information ○ or x is displayed at the upper right of each parallax image based on the refocus evaluation information given in step S2616. The display method is not limited to this. Only parallax images given the refocus evaluation information may be displayed on the display unit 116 one by one, and switched as the time elapses. At this time, the refocus evaluation information of the parallax image is displayed simultaneously.

A display image is displayed on the display unit 116 by performing the above-described processing. This allows the user to easily confirm via the display unit 116 whether the main object of the sensed image acquired by the image sensing apparatus including a microlens array 103 has a parallax amount sufficient for refocus to be performed later.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-282397 filed Dec. 17, 2010 and 2011-251024 filed Nov. 16, 2011, which are hereby incorporated by reference herein in their entirety.

What is claimed is:

1. An image sensing apparatus comprising:
a unit that acquires a sensed image generated from an image signal output from an image sensor for receiving light that becomes incident sequentially through an imaging lens and a microlens array that is a two-dimensional array including a plurality of microlenses;
a creation unit that creates a list in which, for each pixel position on the image sensor, a correspondence between coordinates of the light incident at the pixel position on the imaging lens and coordinates of the pixel position is registered;
a generation unit that generates, as a parallax image group, images obtained by rearranging pixels at pixel positions on the image sensor corresponding to the coordinates in accordance with an arrangement order of the coordinates on the imaging lens registered in the list; and
an output unit that outputs the images generated by said generation unit.

2. The apparatus according to claim 1, wherein said creation unit creates a list in which, for each pixel position on the image sensor, a correspondence between coordinates at which a line segment passing through the pixel position and a center position of the microlens intersects the imaging lens and the coordinates of the pixel position is registered.

3. The apparatus according to claim 1, wherein
upon acquiring an instruction to output one parallax image out of the parallax image group, said output unit outputs said one parallax image to a display screen so as to cause the display screen to display said one parallax image, and
upon acquiring an instruction to output the parallax image group, said output unit outputs the images generated by said generation unit to the display screen so as to cause the display screen to display the images.

4. The apparatus according to claim 3, wherein said output unit outputs only a parallax image having an average pixel value not less than a threshold to the display screen.

5. The apparatus according to claim 3, wherein when pixels collected to generate a parallax image are the same as pixels collected to generate another parallax image, said output unit outputs parallax images other than the parallax image and said other parallax image, to the display screen.

6. A method of controlling an image sensing apparatus including an image sensor for receiving light that becomes incident sequentially through an imaging lens and a microlens array that is a two-dimensional array including a plurality of microlenses, comprising:
a step of acquiring a sensed image generated from an image signal output from the image sensor;
a creation step of creating a list in which, for each pixel position on the image sensor, a correspondence between coordinates of the light incident at the pixel position on the imaging lens and coordinates of the pixel position is registered;
a generation step of generating, as a parallax image group, images obtained by rearranging pixels at pixel positions on the image sensor corresponding to the coordinates in accordance with an arrangement order of the coordinates on the imaging lens registered in the list; and
an output step of outputting the images generated in the generation step.

* * * * *